(12) United States Patent
Shima et al.

(10) Patent No.: US 9,568,114 B2
(45) Date of Patent: Feb. 14, 2017

(54) VALVE UNIT COMPRISING A CHECK VALVE DEVICE

(71) Applicant: JTEKT CORPORATION, Osaka-shi, Osaka (JP)

(72) Inventors: Toshihiko Shima, Okazaki (JP); Akio Nakamura, Okazaki (JP); Kenji Takahashi, Kariya (JP); Shusuke Inagi, Okazaki (JP); Kentaro Hioki, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 210 days.

(21) Appl. No.: 14/335,482

(22) Filed: Jul. 18, 2014

(65) Prior Publication Data

US 2015/0034195 A1   Feb. 5, 2015

(30) Foreign Application Priority Data

Aug. 2, 2013   (JP) .................................. 2013-161761

(51) Int. Cl.
*F16K 15/02* (2006.01)
*F16K 27/02* (2006.01)

(52) U.S. Cl.
CPC ............. *F16K 15/021* (2013.01); *F16K 27/02* (2013.01); *Y10T 137/7879* (2015.04); *Y10T 137/7904* (2015.04)

(58) Field of Classification Search
CPC .. F16K 15/021; F16K 27/02; Y10T 137/7904; Y10T 137/7879
USPC ......................................... 137/511, 512, 538
See application file for complete search history.

(56) References Cited

U.S. PATENT DOCUMENTS

| | | | | |
|---|---|---|---|---|
| 2,306,012 | A * | 12/1942 | Campbell | ............. F16K 15/042 137/512 |
| 2,855,127 | A * | 10/1958 | Lerner | ................ B05B 11/3032 137/533.11 |
| 3,122,159 | A | 2/1964 | Milo | |
| 2009/0146094 | A1* | 6/2009 | Suzuki | .................... F16K 1/303 251/324 |

(Continued)

FOREIGN PATENT DOCUMENTS

JP   A-2013-29161   2/2013

OTHER PUBLICATIONS

Jan. 26, 2015 Extended European Report issued in European Application No. 14178496.7.

*Primary Examiner* — Mary McManmon
*Assistant Examiner* — Daphne M Barry
(74) *Attorney, Agent, or Firm* — Oliff PLC

(57) ABSTRACT

The valve unit includes: a body having a charging passage; a supply-side joint that connects a supply pipe; and a check valve that is disposed in the gas passage, and that inhibits gas from being discharged from the gas tank to the outside of the body. The check valve includes a check valve seat, a check valve element that comes into contact with or moves away from the check valve seat, and a positioning member that fixes the position of the check valve seat in the charging passage. The body has a fitting hole which is communicated with the charging passage and in which the supply-side joint and the positioning member are fitted. The positioning member is fitted in a second fitting hole so as to fix the position of the check valve seat even when the supply-side joint has not been fitted in a first fitting hole.

8 Claims, 3 Drawing Sheets

(56) References Cited

U.S. PATENT DOCUMENTS

2016/0018013 A1* 1/2016 Nishio ................ F16K 17/0433
 137/535

* cited by examiner

VALVE UNIT COMPRISING A CHECK VALVE DEVICE

INCORPORATION BY REFERENCE

The disclosure of Japanese Patent Application No. 2013-161761 filed on Aug. 2, 2013 including the specification, drawings and abstract, is incorporated herein by reference in its entirety.

BACKGROUND OF THE INVENTION

1. Field of the Invention

The invention relates to a valve unit.

2. Description of the Related Art

Conventionally, a gas tank mounted in, for example, a fuel cell vehicle is provided with a valve unit used to control the supply and discharge of high-pressure hydrogen gas reserved in the gas tank. The valve unit includes a body in which a gas passage that provides communication between the inside and the outside of the gas tank is formed, and a valve mechanism used to control the flow of the hydrogen gas flowing through the gas passage. As described in Japanese Patent Application Publication No. 2013-29161 (JP 2013-29161 A), the gas passage is coupled to a pipe extending from external equipment such as a hydrogen gas supply source, via a joint fitted to the body.

Specifically, a body 121 of a valve unit described in JP 2013-29161 A has an fitting hole 123 in which a joint 122 is fitted, as illustrated in FIG. 6. A charging passage 124, which serves as a gas passage through which hydrogen gas is charged into a gas tank, is formed in the body 121. The charging passage 124 opens at the bottom face of the fitting hole 123. The pipe 125 is coupled to the joint 122 to connect the pipe 125 to the charging passage 124.

A check valve 132 that inhibits the hydrogen gas from being discharged externally from the fitting hole 123 is disposed in the charging passage 124. The fitting hole 123-side end portion of the charging passage 124 has a diameter-increased portion 133 that opens at the bottom face of the fitting hole 123, and a valve accommodation portion 134 located adjacent to the diameter-increased portion 133. The valve accommodation portion 134 has an inner diameter that is smaller than that of the diameter-increased portion 133 but larger than that of the other portion of the charging passage 124. The check valve 132 includes: a valve seat 136 having a valve port 135 formed at the center of the valve seat 136; a valve element 137 that moves away from or comes into contact with the valve element 137 to open or close the valve port 135 and the charging passage 124; and an urging member 138 that urges the valve element 137 toward the valve seat 136. When the hydrogen gas is not charged into the gas tank, in the check valve 132, the valve element 137 is urged toward the valve seat 136 by the pressure of the hydrogen gas and the urging force of the urging member 138 to be seated in the valve seat 136. Thus, the valve port 135 of the valve seat 136 is closed. As a result, it is possible to inhibit the hydrogen gas from being discharged from the charging passage 124.

The valve seat 136 is fitted in the diameter-increased portion 133, and is pressed, by a plug 142 disposed in a through-hole 141 of the joint 122, against a step face 143 located between the diameter-increased portion 133 and the valve accommodation portion 134. Thus, the position of the valve seat 136 in the charging passage 124 is fixed (restricted). Therefore, if a worker attempts to remove the joint 122 from the fitting hole 123 by mistake after the hydrogen gas is charged into the gas tank, the position of the valve seat 136 may be offset from the proper position. This raises a possibility that the valve element 137 will fail to firmly close the valve port 135 of the valve seat 136 and the function of the check valve 132 will not be sufficiently fulfilled. Thus, improvement of the reliability of the check valve 132 has been demanded.

SUMMARY OF THE INVENTION

One object of the invention is to provide a valve unit configured to improve the reliability of a check valve.

A valve unit according to an aspect of the invention includes: a body having a gas passage that provides communication between an inside of a gas tank and an outside of the gas tank; a joint that connects a pipe to the gas passage; and a check valve that is disposed in the gas passage, and that inhibits gas from being discharged from the gas tank to an outside of the body.

The valve unit is fitted to the gas tank in which high-pressure gas is reserved.

The check valve includes a valve seat, a valve element that comes into contact with or moves away from the valve seat so as to close or open the gas passage, and a positioning member that fixes a position of the valve seat in the gas passage.

The body has a fitting hole in which the joint and the positioning member are fitted, the fitting hole is communicated with the gas passage, and the joint and the positioning member that have been fitted in the fitting hole are arranged in this order in a direction from the outside of the body toward an inside of the body.

The positioning member is configured to be able to fix the position of valve seat even when the joint has not been fitted in the fitting hole.

According to the above aspect, because the position of the valve seat in the gas passage is fixed by the positioning member, the position of the valve seat is maintained without being offset from the proper position even if the joint is removed from the fitting hole. Thus, even if a worker removes the joint by mistake, the function of the check valve is maintained.

BRIEF DESCRIPTION OF THE DR WINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
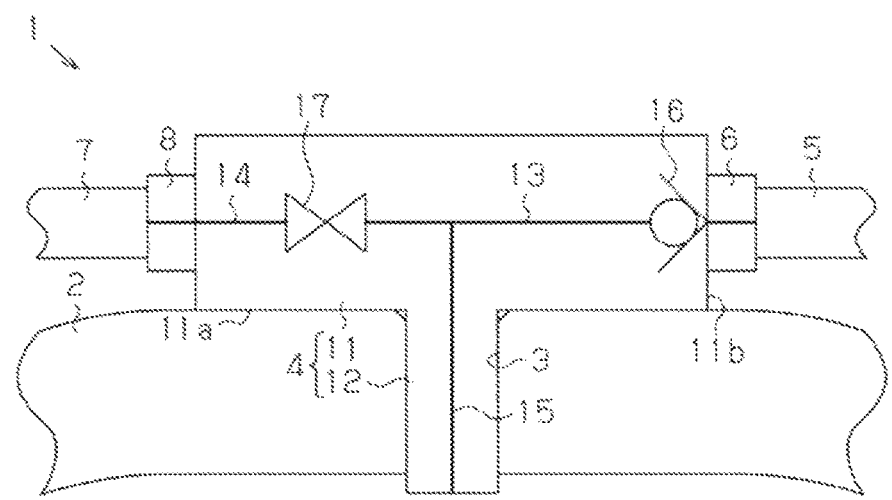
FIG. 1 is a diagram schematically illustrating the configuration of a valve unit.

Hereinafter, a first embodiment of the invention will be described with reference to the accompanying drawings. A valve unit 1 illustrated FIG. 1 is fitted in a fitting hole 3 of a gas tank 2 in which high-pressure (e.g. 70 MPa) hydrogen gas is reserved. The valve unit 1 includes a body 4 made of an aluminum alloy, that is, a valve body, a supply-side joint 6, which serves as a joint that connects the body 4 to a supply pipe 5 extending from a hydrogen gas supply source, and a delivery-side joint 8 that connects the body 4 to a delivery pipe 7 extending to a delivery destination such as a fuel cell. The body 4 has a flat box-shaped body portion 11 disposed outside the gas tank 2, and a fitting portion 12 inserted into the fitting hole 3. The fitting portion 12 is formed into a columnar shape extending in a direction substantially orthogonal to a bottom face 11a of the body portion 11 (extending downward in FIG. 1).

The body portion 11 has a charging passage 13 through which the hydrogen gas from the supply pipe 5 is charged into the gas tank 2, and a delivery passage 14 through which the hydrogen gas is delivered to a delivery destination such as a fuel cell via the delivery pipe 7. The fitting portion 12 has a connection passage 15 that is connected to both the charging passage 13 and the delivery passage 14 and that opens into the gas tank 2. That is, in the present embodiment, the charging passage 13 and the connection passage 15 constitute a gas passage that provides communication between the inside of the gas tank 2 and the outside of the gas tank 2. A check valve 16 that inhibits the hydrogen gas charged in the gas tank 2 from being discharged to the outside of the body 4 and the valve unit 1 is disposed in the charging passage 13. A solenoid valve 17 that controls the supply of the hydrogen gas to the delivery destination is disposed in the delivery passage 14. In the valve unit 1, the supply pipe 5 is coupled to the supply-side joint 6 to connect the supply pipe 5 to the charging passage 13, and the delivery pipe 7 is coupled to the delivery-side joint 8 to connect the delivery pipe 7 to the delivery passage 14.

Figure 2:
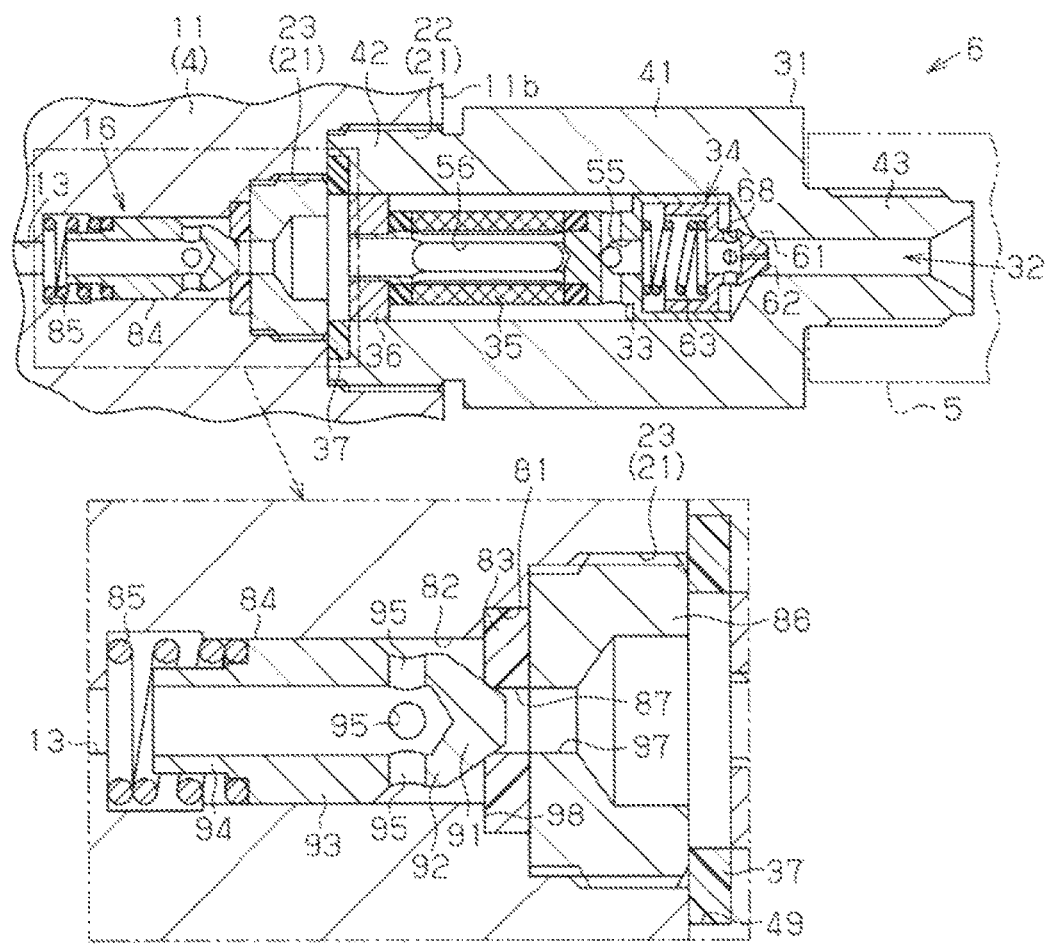
FIG. 2 is a partial sectional view illustrating the junction between a body and a supply-side joint in a first embodiment of the invention.

Next, the configuration of the junction between the body 4 and the supply-side joint 6 will be described. As illustrated in FIG. 2, a fitting hole 21, which is a circular hole, is formed in a side the 11b of the body portion 11 so as to extend in a direction substantially orthogonal to the side face 11b (in the right-left direction in FIG. 2). The fitting hole 21 has a first fitting hole 22 that opens at the side face 11b, and a second fitting hole 23 that is coaxial with and adjacent to the first fitting hole 22. The first fitting hole 22 has an inner diameter that is larger than the inner diameter of the second fitting hole 23. Internal threads are formed in the inner peripheral faces of the body portion 11, which define the first fitting hole 22 and the second fitting hole 23. The supply-side joint 6 is screwed into the first fitting hole 22 and thus fitted in the first fitting hole 22. A positioning member 86 (described later) is screwed into the second fitting hole 23 and thus fitted in the second fitting hole 23.

In the vicinity of the side face 11b of the body portion 11, the charging passage 13 extends linearly so as to be coaxial with the first fitting hole 22 and the second fitting hole 23, and opens at a bottom face of the second fitting hole 23. Thus, the inside of the fitting hole 21 is communicated with the charging passage 13. The check valve 16 is disposed in the charging passage 13.

First, the configuration of the supply-side joint 6 will be described in detail. The supply-side joint 6 includes a cylindrical joint body 31, and is configured by disposing a support member 33, a throttle valve 34, a filter 35, a plug 36 and a seal member 37 in a through-hole 32 that extends through the joint body 31 in the axial direction of the supply-side joint 6. The through-hole 32 is formed so as to be coaxial with the charging passage 13 in the state where the joint body 31 is fitted in the first fitting hole 22.

Figure 3:
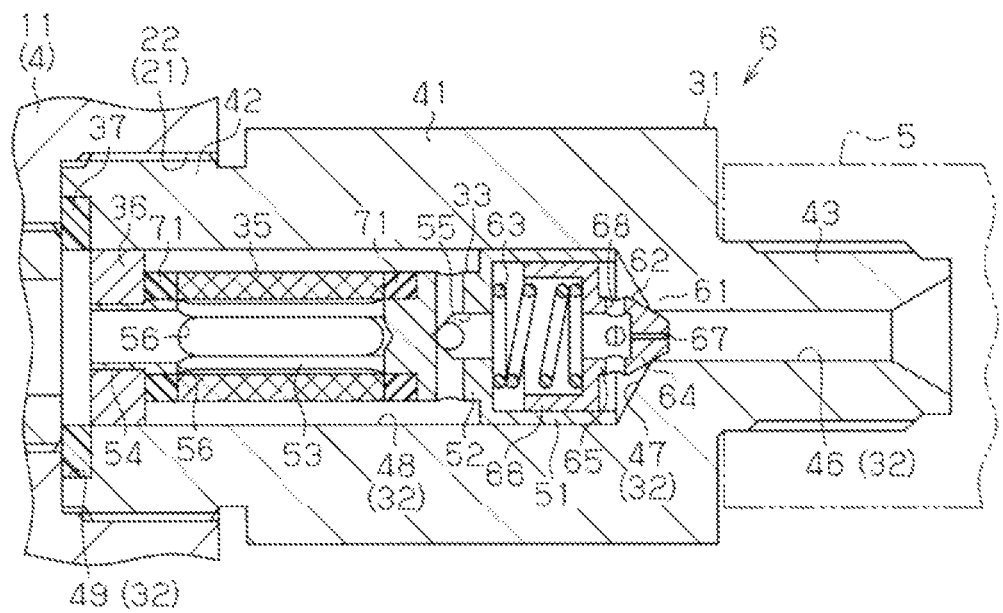
FIG. 3 is an enlarged sectional view illustrating the supply-side joint in the first embodiment.

Specifically, as illustrated in FIG. 3, the joint body 31 has a held portion 41 held by a tool or the like, a body-side coupled portion 42 that protrudes, from the held portion 41, on the side on which the body 4 of the valve unit 1 is located (protrudes leftward in FIG. 3), and a pipe-side coupled portion 43 that protrudes, from the held portion 41, on the side on which the supply pipe 5 is located (protrudes rightward in FIG. 3). The held portion 41 has an outer peripheral face that is partially cut, and thus has a hexagonal shape in a section orthogonal to the axial direction of the supply-side joint 6. The body-side coupled portion 42 has an external thread that is formed in in its outer peripheral face, and that is screwed to the internal thread of the first fitting hole 22. The pipe-side coupled portion 43 has an external thread that is formed in its outer peripheral face and that is screwed to an internal thread formed in the inner peripheral face of the supply pipe 5. Thus, the joint body 31 is fitted to the body portion 11 by screwing the body-side coupled portion 42 into the first fitting hole 22 such that the held portion 41 and the pipe-side coupled portion 43 protrude from the side face 11b of the body portion 11.

The through-hole 32 formed in the joint body 31 is sectioned into a small-diameter hole 46, a tapered hole 47, a large-diameter hole 48 and a diameter-increased hole 49 in the stated order in a direction from the pipe-side coupled portion 43 (the right side in FIG. 3) toward the body-side coupled portion 42. The small-diameter hole 46 has an inner diameter that is smaller than those of the other holes 47 to 49, and is formed in a region from an end face of the pipe-side coupled portion 43 to the held portion 41. The large-diameter hole 48 has an inner diameter that is larger than the inner diameter of the small-diameter hole 46 but is smaller than the inner diameter of the diameter-increased hole 49. The large-diameter hole 48 is formed in a region from an end face of the body-side coupled portion 42 to a position near the pipe-side coupled portion 43, in the held portion 41. The tapered hole 47 is located between the small-diameter hole 46 and the large-diameter hole 48 such that the diameter of the tapered hole 47 is gradually increased in a direction from the small-diameter hole 46 to the large-diameter hole 48. The diameter-increased hole 49 has an inner diameter that is larger than those of the other holes 46 to 48, and opens at an end face of the body-side coupled portion 42.

The support member 33 has a valve chamber defining portion 51, a columnar portion 52, a pipe portion 53 and a fitting portion 54 that are arranged in the stated order in a direction from the pipe-side coupled portion 43 (the right side in FIG. 3). The support member 33 is disposed in the large-diameter hole 48. The valve chamber defining portion 51 is formed into a cylindrical shape, and has an outer diameter that is substantially equal to the inner diameter of the large-diameter hole 48. The columnar portion 52 is formed into a columnar shape, and has an outer diameter that is smaller than the outer diameter of the valve chamber defining portion 51. A flow passage 55 is formed in the columnar portion 52 so as to extend through the columnar portion 52 and open into the valve chamber defining portion 51. The pipe portion 53 is formed into a cylindrical shape, and has an outer diameter is that is smaller than the outer diameter of the columnar portion 52. A plurality of elongated holes 56 is formed in the pipe portion 53 so as to extend through the pipe portion 53 from the inside to the outside thereof. The fitting portion 54 is formed into a cylindrical shape, and has an outer diameter that is slightly smaller the outer diameter of the pipe portion 53.

The throttle valve 34 includes a throttle valve element 62 disposed so as to be allowed to come into contact with or move away from a throttle valve seat 61 that is the boundary between the small-diameter hole 46 and the tapered hole 47, and an urging member 63 such as a coil spring, which urges the throttle valve element 62 toward the throttle valve seat 61. In the present embodiment, the tapered hole 47-side opening of the small-diameter hole 46 serves as a valve port (throttle valve port) of the throttle valve seat 61. Both the throttle valve element 62 and the urging member 63 are accommodated in the valve chamber defining portion 51 of the support member 33.

The throttle valve element 62 has a valve portion 64, a tubular portion 65 and a tubular accommodation a portion 66 that are arranged in the stated order in a direction from the throttle valve seat 61 (the right side in FIG. 3). The valve portion 64 is tapered such that the outer diameter thereof is gradually decreased from the tubular portion 65. The maximum outer diameter of the valve portion 64 is smaller than the inner diameter of the large-diameter hole 48 but is larger than the inner diameter of the small-diameter hole 46. The minimum outer diameter of the valve portion 64 is smaller than the inner diameter of the small-diameter hole 46. A minute hole 67 is formed in the valve portion 64 so as to open at the center of a distal end portion of the valve portion 64 and opened into the tubular portion 65. The tubular portion 65 is formed into a cylindrical shape, and has an outer diameter that is smaller than the inner diameter of the valve chamber defining portion 51. A plurality of side holes 68 is formed in the tubular portion 65 so as to extend through the tubular portion 65 from the inside to the outside thereof. The tubular accommodation portion 66 is formed into a cylindrical shape, and has an outer diameter that is substantially equal to the inner diameter of the valve chamber defining portion 51, and has an inner diameter that is larger than the outer diameter of the tubular portion 65. The urging member 63, which has been compressed in the axial direction from its natural length, is accommodated in the tubular accommodation portion 66. The throttle valve element 62 is urged toward the throttle valve seat 61 by the urging member 63.

The filter 35 is formed into a cylindrical shape, and has an inner diameter that is substantially equal to the outer diameter of the pipe portion 53 of the support member 33, and has an outer diameter that is smaller than the inner diameter of the large-diameter hole 48. The filter 35 in the present embodiment is formed from a wire mesh. The filter 35 is interposed between annular gaskets 71 disposed at the opposite ends of the filter 35, and is fitted on the outer periphery of the pipe portion 53 so as to be radially opposed to the elongated holes 56 of the pipe portion 53.

The plug 36 is formed into an annular shape, and has an inner diameter that is substantially equal to the outer diameter of the fitting portion 54, and has an outer diameter that is substantially equal to the inner diameter of the large-diameter hole 48 of the through-hole 32. The plug 36 is fitted on the outer periphery of the fitting portion 54 in the state where the gaskets 71 disposed on the axially opposite sides of the filter 35 are compressed.

The seal member 37 is made of an elastic material such as polyimide resin. The seal member 37 is formed in an annular shape, and is fitted in the diameter-increased hole 49. The seal member 37 is held between the both portion 11 and the joint body 31 of the supply-side joint 6 in the state where the joint body 31 is fitted in the first fitting hole 22. Thus, the seal member 37 is brought into close contact with the joint body 31 and the body portion 11 to hermetically seal a gap between the joint body 31 and the body portion 11 (and the fitting hole 21).

Next, the configuration of the check valve 16 will be described in detail. As illustrated a partially enlarged view in the lower half of FIG. 2, diameter-increased portion 81 that opens at a bottom face of the second fitting hole 23 and a valve accommodation portion 82 that is adjacent to the diameter-increased portion 81 are formed in a bottom portion of the fitting hole 21 communicated with the charging passage 13. The valve accommodation portion 82 has an inner diameter that is smaller than the inner diameter of the diameter-increased portion 81, but that is larger than the inner diameter of the charging passage 13. An anodic oxide coating is applied to the inner peripheral face of the valve accommodation portion 82.

The check valve 16 includes a check valve seat 83 that serves as a valve seat, a check valve element 84 that serves as a valve element disposed so as to be allowed to come into contact with or move away from the check valve seat 83, and an urging member 85, such as a coil spring, which urges the check valve clement 84 toward the check valve seat 83. The check valve 16 in the present embodiment further includes the positioning member 86 that fixes the position of the check valve seat 83 in the charging passage 13, that is, the gas passage.

The check valve seat 83 is made of an elastic material such as polyimide resin. The check valve seat 83 has an annular shape, and a check valve port 87, which axially extends through the check valve seat 83, is formed at the center of the check valve seat 83. The check valve seat 83 is fitted in the diameter-increased portion 81. The check valve port 87 is disposed so as to be coaxial with the charging passage 13 in the state where the check valve seat 83 is fitted in the diameter-increased portion 81.

The check valve element 84 is made of stainless steel. The check valve element 84 has a blocking portion 91, a small-diameter tubular portion 92, a large-diameter tubular portion 93 and a support portion 94 that are arranged in the stated order in a direction from the check valve seat 83 (the right side in FIG. 2). The blocking portion 91 is tapered such that the outer diameter of the blocking portion 91 is gradually decreased from the small-diameter tubular portion 92. The small-diameter tubular portion 92, the large-diameter tubular portion 93 and the support portion 94 are each formed into a cylindrical shape. The maximum outer diameter of the blocking portion 91 is smaller than the inner diameter of the valve accommodation portion 82 but is larger than the inner diameter of the check valve port 87 of the check valve seat 83. The minimum outer diameter of the blocking portion 91 is smaller than the inner diameter of the check valve port 87. The check valve element 84 closes the check valve port 87 when the distal end portion of the blocking portion 91 is inserted into the check valve port 87 and seated in the check valve seat 83, and opens the check valve port 87 when the blocking portion 91 moves away from the check valve seat 83. That is, the check valve element 84 comes into contact with or moves away from the check valve seat 83 to close or open the charging passage 13 (gas passage).

The small-diameter tubular portion 92 has an outer diameter that is smaller than the inner diameter of the valve accommodation portion 82. A plurality of side holes 95 is formed in the small-diameter tubular portion 92 so as to extend through the small-diameter tubular portion 92 from the inside to the outside of the small-diameter tubular portion 92. The large-diameter tubular portion 93 has an outer diameter that is substantially equal to the inner diameter of the valve accommodation portion 82. The support portion 94 has an outer diameter that is slightly smaller than the outer diameter of the large-diameter tubular portion 93.

The check valve seat 83-side end portion of the urging member 85 is fitted to the outer periphery of the support portion 94 of the check valve element 84. The urging member 85, which has been compressed in the axial direction from its natural length, is accommodated in the valve accommodation portion 82 together with the check valve element 84. Thus, the check valve element 84 is pressed toward the check valve seat 83 by the urging member 85.

The positioning member 86 is formed in a substantially cylindrical shape. An external thread, which is screwed into the internal thread of the second fitting hole 23, is formed on the outer periphery of the positioning member 86. A communication hole 97 is formed in the positioning member 86 so as to extend through the positioning member 86 in the axial direction. The communication hole 97 is formed so as to be coaxial with the charging passage 13 in the state where positioning member 86 is fitted in the second fitting hole 23. The charging passage 13 is communicated with the through-hole 32 of the supply-side joint 6 (joint body 31) through the communication hole 97. Thus, the supply-side joint 6 and the positioning member 86 are fitted in the fitting hole 21 so as to be coaxial with the fitting hole 21 (which includes the first fitting hole 22 and the second fitting hole 23). Thus, the supply-side joint 6 and the positioning member 86 are arranged in the stated order from the supply pipe 5-side of the body portion 11 of the body 4, that is, from the side face 11*b*.

The positioning member 86 has an axial length that is substantially equal to the depth (the length in the right-left direction in FIG. 2) of the second fitting hole 23. Thus, the positioning member 86 that is fitted in the second fitting hole 23 does not protrude into the first fitting hole 22. That is, the positioning member 86 is not overlapped with the supply-side joint 6 in the axial direction of the fitting hole 21. That is, the position of the positioning member 86 in the axial direction and the position of the supply-side joint 6 in the axial direction are not overlapped with each other in the axial direction (depth direction) of the fitting hole 21.

The positioning member 86 fitted in the second fitting hole 23 presses the check valve seat 83, which is fitted in the diameter-increased portion 81, against the step face 98 located between the diameter-increased portion 81 and the valve accommodation portion 82, thereby fixing (restricting) the position of the check valve seat 83 in the charging passage 13 (the gas passage). That is, the position of the check valve seat 83 in the charging passage 13 is fixed by the positioning member 86 that is a member independent from the supply-side joint 6. Thus, the positioning member 86 is able to fix the position of the check valve seat 83 in the charging passage 13 even before the supply-side joint 6 is fitted in the fitting hole 21. The check valve seat 83 is held between the positioning member 86 and the body portion 11 (the diameter-increased portion 81). Thus, the check valve seat 83 is brought into close contact with both the body portion 11 and the positioning member 86 to hermetically seal a gap between the body portion 11 and the positioning member 86.

Next the operation of the valve unit 1 in the present embodiment will be described. In the case where hydrogen gas is charged into the gas tank 2, the supply pipe 5 is connected to the supply-side joint 6 and the hydrogen gas is introduced into the supply-side joint 6 (refer to FIG. 2). At this time, the throttle valve element 62 of the throttle valve 34 is moved away from the throttle valve seat 61 toward the body 4 by the pressure of the hydrogen gas, against the urging force of the urging member 63. Thus, a large amount of hydrogen gas flows into the valve chamber defining portion 51 in the support member 33 through the small-diameter hole 46. The hydrogen gas charged into the valve chamber defining portion 51 flows into the charging passage 13 through the side holes 68 formed in the throttle valve element 62, the flow passages 55 formed in the columnar portion 52 of the support member 33, the filter 35, the elongated holes 56 formed in the pipe portion 53 and the communication hole 97 of the positioning member 86. Then, the check valve element 84 of the check valve 16 is moved toward the inside of the charging passage 13 away from the check valve seat 83 by the pressure of the hydrogen gas, against the urging force of the urging member 85. Thus, the hydrogen gas flows into the valve accommodation portion 82, and thus the hydrogen gas is charged into the gas tank 2 after flowing through the side holes 95 of the check valve element 84 and through the inside of the check valve element 84.

On the other hand, in the case where hydrogen gas is not charged into the gas tank 2, the check valve element 84 is urged toward the check valve seat 83 by the pressure of the hydrogen gas in the gas tank 2 and the charging passage 13 and by the urging force of the urging member 85, and thus seated in the check valve seat 83. Thus, the check valve port 87 of the check valve seat 83 is closed, and as a result, the hydrogen gas in the gas tank 2 is inhibited from being discharged to the outside of the body 4. Further, the throttle valve element 62 is seated in the throttle valve seat 61 by the urging force of the urging member 63. The minute hole 67 is formed in the throttle valve element 62 as described above. Thus, the flow of the hydrogen gas is not completely shut off even when the throttle valve element 62 is seated in the throttle valve seat 61. Thus, the throttle valve 34 serves as an excess flow stop valve that allows a minute amount of hydrogen gas to flow from the large-diameter hole 48 to the small-diameter hole 46. If, for example, the check valve element 84 is damaged, a minute amount of hydrogen gas is externally discharged through the throttle valve 34, and thus a worker notices occurrence of an abnormality of the valve unit 1, and in particular, an abnormality of the check valve 16.

The following description will be provided on the assumption that a worker removes, by mistake, the supply-side joint 6 (which includes the joint body 31) from the fitting hole 21 after the hydrogen gas is charged into the gas tank 2. Even in this case, the positioning member 86 is still screwed to the second fitting hole 23, and thus the position of the check valve seat 83 is maintained. Thus, it is possible to reduce the possibility that check valve element 84 will fail to firmly close the check valve port 87 due to offset of the position of the check valve seat 83 from the proper position or the possibility that the close contact between the check valve seat 83, and the body portion 11 and the positioning member 86 is loosened due to offset of the position of the check valve seat 83 from the proper position. Thus, the function of the check valve 16 is maintained.

The following description will be provided on the assumption that, for example, a vehicle collision occurs and, for example, a vehicle wheel hits the outer peripheral face of the supply-side joint 6 in a direction substantially orthogonal to the axial direction of the supply-side joint 6. In this case, there is a possibility that, for example, the supply-side joint 6 will be deformed due to an impact caused as, for example, the vehicle wheel hits the supply-side joint 6 and thus the supply-side joint 6 will be inclined in the first fitting hole 22. In this regard, in the valve unit 1 in the present embodiment, because the position of the supply-side joint 6 in the axial direction and the position of the positioning member 86 in the axial direction are not overlapped with each other in the axial direction of the fitting hole 21, the supply-side joint 6 is less likely to contact the positioning member 86 even if the supply-side joint 6 is inclined due to an impact. Further, in the valve unit 1 in the present embodiment, the diameter of the second fitting hole 23 is smaller than that of the first fitting hole 22 so that a step is present between the inner peripheral face that defines the first fitting hole 22 and the inner peripheral face that defines the second fitting hole 23 as described above. Thus, even if the first fitting hole 22 is deformed due to an impact, the influence of the deformation is less likely to be exerted on the second fitting hole 23. Therefore, even if a high impact acts on the supply-side joint 6, the position of the positioning member 86 in the second fitting hole 23 is less likely to be offset from the proper position.

Next, a valve unit according to a second embodiment of the invention will be described with reference the accompanying drawings. For convenience of explanation, the same configurations as those in the first embodiment will be denoted by the same reference symbols as those in the first embodiment and description thereof will be omitted.

Figure 4:
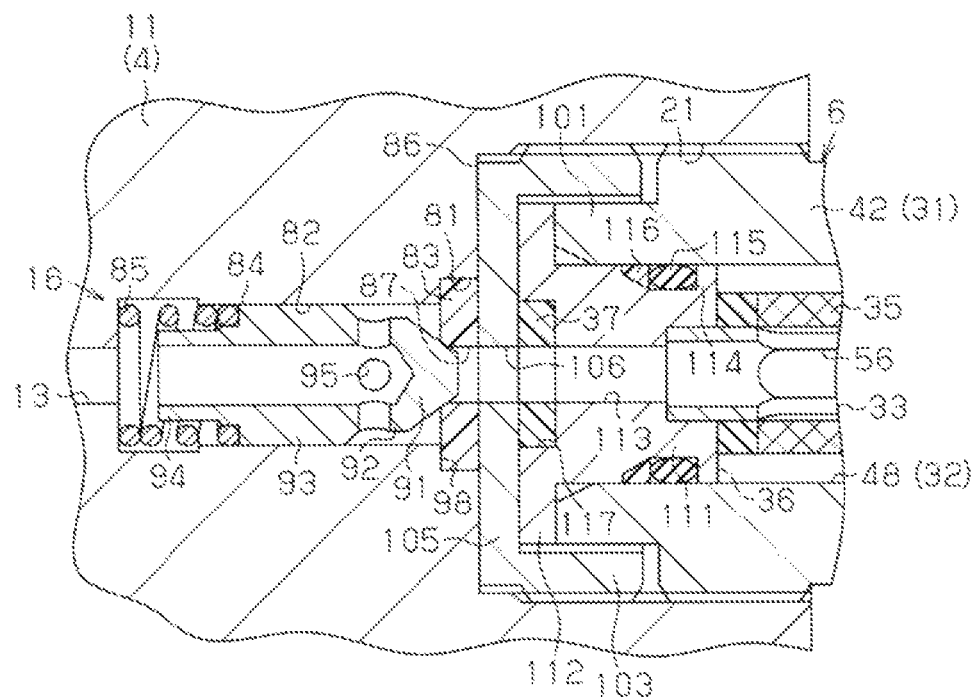
FIG. 4 is a partial sectional view illustrating the junction between a body and a supply-side joint according to a second embodiment of the invention.

As illustrated in FIG. 4, a fitting hole 21 in the present embodiment is formed to have an inner diameter that is substantially uniform over the entire length of the fitting hole 21 in the axial direction (depth direction) of the fitting hole 21. An internal thread is formed in the inner peripheral face of a body portion 11, which defines the fitting hole 21. A joint body 31 of a supply-side joint 6 and a positioning member 86 are screwed into the internal thread to be fitted in the fitting hole 21.

The joint body 31 has a cylindrical protrusion 101 that protrudes from a body-side coupled portion 42. The protrusion 101 has an outer diameter that is smaller than the outer diameter of the body-side coupled portion 42. A through-hole 32 of the joint body 31 does not have a diameter-increased hole 49, unlike in the first embodiment.

The positioning member 86 is formed in a shape obtained by connecting a bottom portion to a cylindrical portion. An external thread, which is screwed to the internal thread of the fitting hole 21, is formed on the outer periphery of a cylindrical portion 103 of the positioning member 86. The cylindrical portion 103 has an inner diameter that is substantially equal to the outer diameter of the protrusion 101 of the joint body 31, and the protrusion 101 is inserted in the cylindrical portion 103. That is, the positioning member 86 in the present embodiment is overlapped with the supply-side joint 6 in the axial direction of the fitting hole 21. That is, the position of the positioning member 86 in the axial direction and the position of the supply-side joint 6 in the axial direction are overlapped with each other in the axial direction of the fitting hole 21. A bottom portion 105 of the positioning member 86 has a communication hole 106 that extends through the bottom portion 105 in the axial direction of the positioning member 86. The communication hole 106 is formed to be coaxial with the charging passage 13 in the state where the positioning member 86 is fitted in the fitting hole 21.

A plug 36 has an insertion portion 111 and a flange 112 formed on the positioning member 86 side with respect to the insertion portion 111. The plug 36 has an axial hole 113 that is formed at the center of the plug 36 and that extends though the plug 36. The insertion portion 111 has an outer diameter that is substantially equal to the inner diameter of the large-diameter hole 48 in the joint body 31. An annular groove 114 is formed in the outer peripheral face of the insertion portion 111 so as to extend in the circumferential direction of the insertion portion 111, and an O-ring 115 and a backup ring 116 are fitted in the annular groove 114. Thus, a gap between the plug 36 and the joint body 31 is hermetically sealed. The flange 112 has an outer diameter that is substantially equal to the inner diameter of the cylindrical portion 103 of the positioning member 86, and is axially opposed to the protrusion 101 of the joint body 31. A diameter-increased hole 117 is formed in the flange 112-side end portion (left end portion in FIG. 4) of the axial hole 113, and has a diameter that is larger than that of the remaining portion of the axial hole 113. A seal member 37 is fitted in the diameter-increased hole 117.

The seal member 37 is held between the plug 36 and the positioning member 86 by the flange 112 that is pressed by the protrusion 101 of the joint body 31 fitted in the fitting hole 21. Thus, the seal member 37 is brought into close contact with both the plug 36 and the positioning member 86 to hermetically seal a gap between the positioning member 86 and the plug 36.

According to the present embodiment, the following advantageous effects are produced, as in the first embodiment. The position of the check valve seat 83 in the charging passage 13, and in particular in the diameter-increased portion 81, is fixed by the positioning member 86 that is independent from the supply-side joint 6. Therefore, even if a worker removes the supply-side joint 6 by mistake, the position of the check valve seat 83 is maintained, and it is thus possible to maintain the function of the check valve 16. Note that the above-described embodiments may be modified as follows.

In the first embodiment, the fitting hole 21 has the first fitting hole 22 and the second fitting hole 23 that have different inner diameters. However, the configuration of the fitting hole 21 is not limited to this. For example, the fitting hole 21 may be formed to have an inner diameter that is substantially uniform over its entire depthwise (axial) length.

Figure 5:
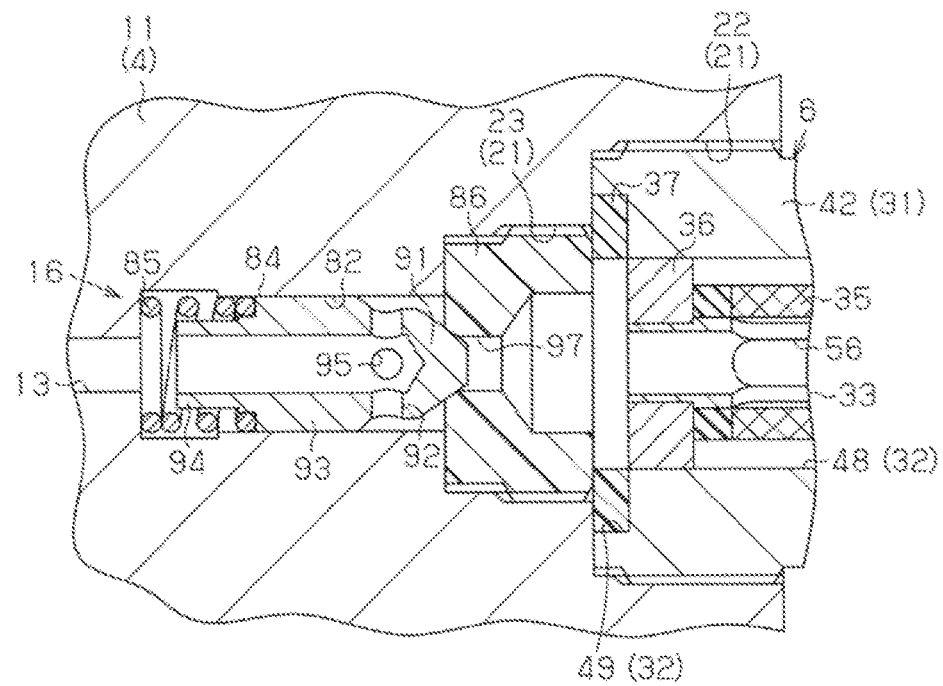
FIG. 5 is a partial sectional view illustrating the junction between a body and a supply-side joint according to another embodiment of the invention.
Figure 6:
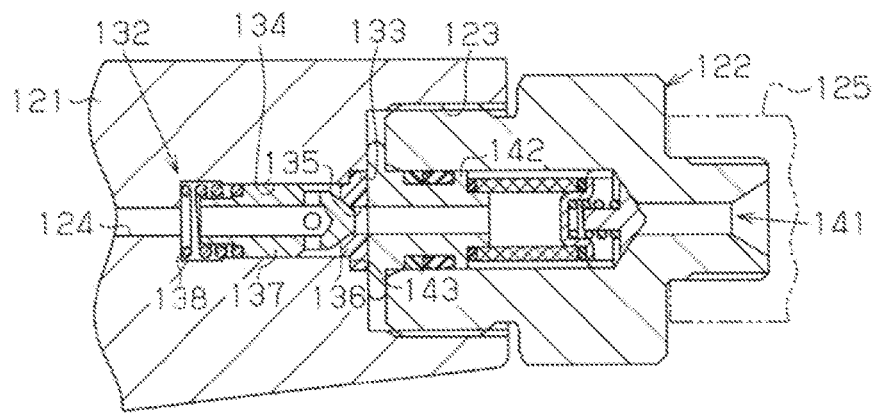
FIG. 6 is a partial sectional view illustrating the junction between a body and a supply-side joint in related art.

In the first embodiment, the check valve 16 has the annular check valve seat 83 that is independent from the positioning member 86. However, the configuration of the check valve 16 is not limited to this. For example, as illustrated in FIG. 5, the check valve element 84 may come into contact with or move away from the positioning member 86 that is made of an elastic material such as polyimide resin to close or open the communication hole 97 (check valve port) of the positioning member 86. That is, the positioning member 86 may also serve as a check valve seat. Similarly, in the second embodiment, the positioning member 86 may also serve as a check valve seat.

In the example illustrated in FIG. 5, the positioning member 86 may be made of elastically deformable soft metal such as brass or a copper alloy. It goes without saying that the check valve seat 83 and the seal member 37 may be made of soft metal in the above-described embodiments In the above-described embodiments, the joint body 31 and the positioning member 86 are fitted in the fitting hole 21 (which includes the first fitting hole 22 and the second fitting hole 23) by screwing. However, the method of fitting the joint body 31 and the positioning member 86 in the fitting hole 21 is not limited to this. The joint body 31 and the positioning member 86 may be fitted in the fitting hole 21, for example, by press-fitting.

In the above-described embodiments, the supply-side joint 6 that does not have the throttle valve 34 may be used. In the above-described embodiments, coil springs are used as the urging members 63, 85. However, the urging members 63, 85 are not limited to the coil springs. For example, coned disc springs or elastic members may be used. When the check valve element 84 can be urged toward the check valve seat 83 by the pressure of the hydrogen gas, and when the throttle valve element 62 can be urged toward the throttle valve seat 61 by the pressure of the hydrogen gas, provision of an urging member is not required.

In the above-described embodiments, the valve unit 1 is attached to the gas tank 2 in which the hydrogen gas is reserved. However, the kind of gas tank to which the valve unit 1 is attached is not limited to this. For example, the valve unit 1 may be attached to a gas tank in which gas other than hydrogen gas is reserved.

What is claimed is:

1. A valve unit comprising:
    a body having a gas passage that is configured to provide communication between an inside of a gas tank and an outside of the gas tank;
    a joint that is configured to connect a pipe extending from an external gas supply source to the gas passage; and
    a check valve that is disposed in the gas passage, and that inhibits gas from being discharged from the gas tank to an outside of the body, wherein
    the valve unit is configured to be fitted to the gas tank in which high-pressure gas is reserved,
    the check valve is disposed in the gas passage, and the check valve includes a valve seat, a valve element that comes into contact with or moves away from the valve seat so as to close or open the gas passage, and a positioning member that fixes a position of the valve seat in the gas passage,
    the body has a fitting hole in which the joint and the positioning member are fitted, the fitting hole is communicated with the gas passage, and the joint and the positioning member are configured to be fitted in the fitting hole,
    the joint, the positioning member, the valve seat, and the valve element are arranged in this order in a direction from the outside of the body toward an inside of the body along a gas low path, and
    the positioning member is configured to be able to fix the position of the valve seat even when the joint has not been fitted in the fitting hole,
    the joint, the positioning member, the valve seat, and the valve element are arranged in this order in a direction from the outside of the body toward an inside of the body along a gas flow path, and
    the positioning member is configured to be able to fix the position of the valve seat even when the joint has not been fitted in the fitting hole.

2. The valve unit according to claim 1, wherein axial positions of the positioning member and the joint that are fitted to the body are not overlapped with each other in an axial direction of the fitting hole.

3. The valve unit according to claim 2, wherein the fitting hole has a first fitting hole in which the joint is fitted, and a second fitting hole in which the positioning member is fitted and that has a diameter smaller than a diameter of the first fitting hole.

4. The vale unit according to claim 1, wherein the fitting hole has a first fitting hole in which the joint is fitted, and a second fitting hole in which the positioning member is fitted and that has a diameter smaller than a diameter of the first fitting hole.

5. The valve unit according to claim 1, wherein:
    a valve accommodation portion that is a hole accommodating the valve element of the check valve, and a diameter-increased portion that is a hole accommodating the valve seat, are formed in an end portion of the gas passage in the body, the end portion being on a side of the joint, the gas passage extending from the check valve to the inside of the gas tank;
    the diameter-increased portion is adjacent to the valve accommodation portion so as to be located closer to the joint than the valve accommodation portion is, and the diameter-increased portion has an inner diameter larger than an inner diameter of the valve accommodation portion; and
    the valve seat has an annular shape, and is pressed against a step face located between the diameter-increased portion and the valve accommodation portion by the positioning member to fix the position of the valve seat in the gas passage.

6. The valve unit according to claim 1, wherein the joint and the positioning member are screwed into the fitting hole.

7. The vale unit according to claim 1, wherein the valve seat is made of an elastic material.

8. The valve unit according to claim 1, wherein the positioning member is made of an elastic material, and is integrally formed with the valve seat.

* * * * *